Sept. 13, 1932.　　　G. M. CHAPIN ET AL　　　1,877,266
APPARATUS FOR THE MANUFACTURE OF FEED FOR CHICKENS AND OTHER ANIMALS
Filed June 2, 1928　　　3 Sheets-Sheet 1

Inventors:
George M. Chapin
Hugh H. Goff,
By W. E. Williams Atty.

Sept. 13, 1932.  G. M. CHAPIN ET AL  1,877,266
APPARATUS FOR THE MANUFACTURE OF FEED FOR CHICKENS AND OTHER ANIMALS
Filed June 2, 1928  3 Sheets-Sheet 2
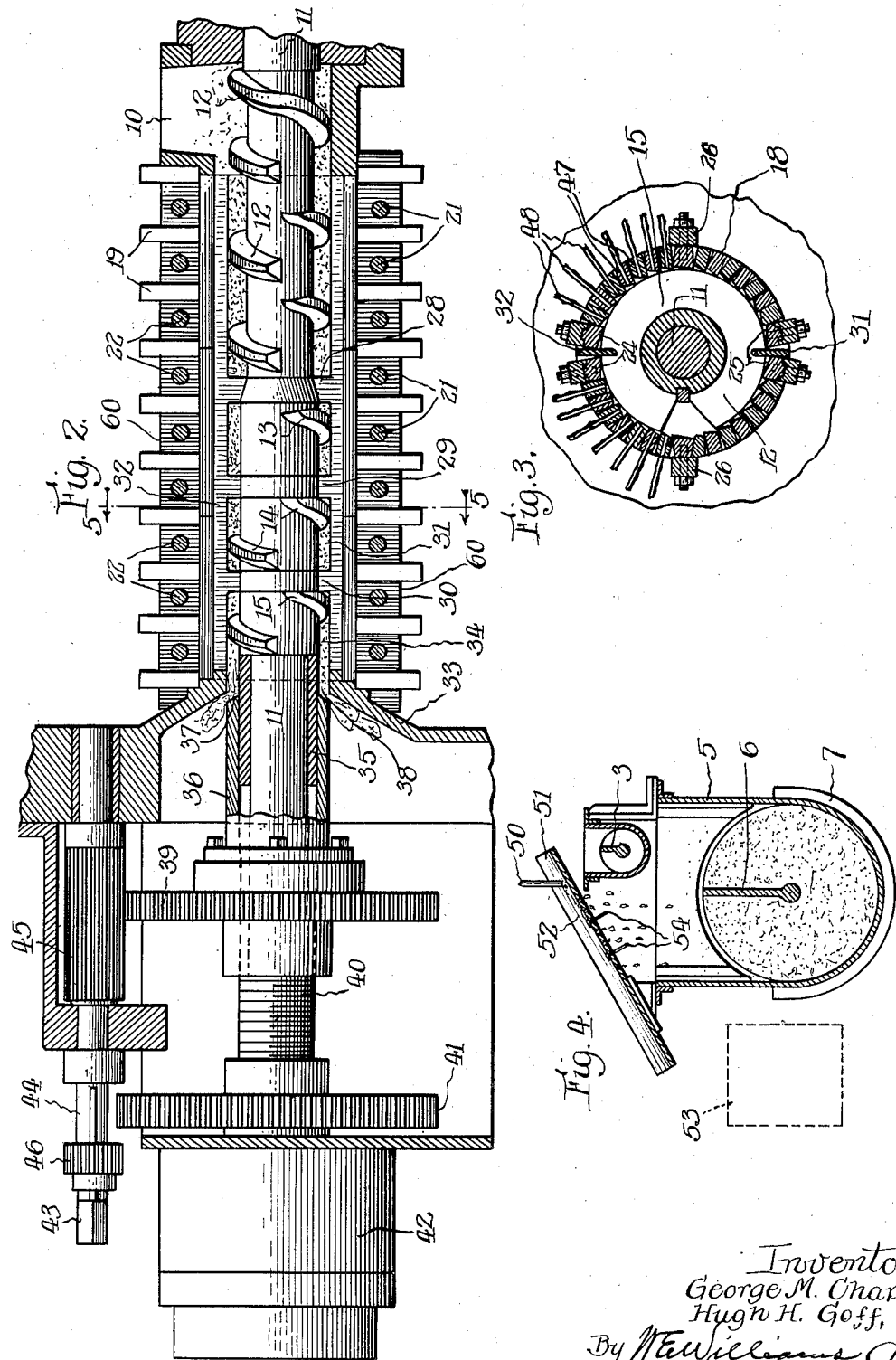
Inventors
George M. Chapin,
Hugh H. Goff,
By W. E. Williams Atty.

Sept. 13, 1932.   G. M. CHAPIN ET AL   1,877,266
APPARATUS FOR THE MANUFACTURE OF FEED FOR CHICKENS AND OTHER ANIMALS
Filed June 2, 1928   3 Sheets-Sheet 3

Inventors:
George M. Chapin,
Hugh H. Goff,
By *[signature]*
Atty.

Patented Sept. 13, 1932

1,877,266

UNITED STATES PATENT OFFICE

GEORGE MAXSON CHAPIN AND HUGH HARDING GOFF, OF HAMMOND, INDIANA

APPARATUS FOR THE MANUFACTURE OF FEED FOR CHICKENS AND OTHER ANIMALS

Application filed June 2, 1928. Serial No. 282,486.

This invention relates to feeds and their manufacture which are compounded out of various different food elements for aiming at the result of producing the food that will carry a certain quality of ration, as it were, somewhat balanced for special feeding purposes producing in kernel or granular form a feed of given value containing ingredients in assembled form which ingredients are not found in any single feed material but must be made up and fed in the mixed or separate forms as has heretofore been the practice.

The object of the invention is to produce any desired feed for chickens and animals in what may be termed a granular form combining elements not normally found combined in any one fed article, the purpose being to put this in kernel or granular form and thus save losses which are incurred in feeding the same materials as separate units or mixed up by the ordinary methods. In the feeding of chickens especially it has been the habit to feed various different things such as meals of grains, meat scraps, mashes of various kinds in a dry or wet mix, the point being to give the chickens what experimentation has proved the most desirable for growth, development, or egg-laying purposes.

Notwithstanding the fact that nature normally gives instinct to living beings to select that particular class of food that they need, yet withal, when the animal comes under the control of man, man desired results which are different somewhat from the normal habits of such beings when in wild or feral state. Man feeds chickens to grow faster and lay more eggs and consume less feed than a chicken, if left to his own choice, might normally do, but by taking advantage of certain features of palatability, man induces the animal or bird to consume what experimentation has proved will cause the development in the animal or bird which man desires for his special purpose.

In the feeding of chickens particularly, it has been the habit to feed a variety of materials, sometimes in the form of dry mash or sometimes in the form of mixed wet mash and, in either case, there is a large percentage of waste. In the form of the dry mash the wind blows some of it away and the chickens stir it up and lose some of it and are inconvenienced by insufficient or too much water in swallowing the stuff; in the form of the wet mash much of it adheres to the birds' bills which the birds throw off by wiping off their bills and further the birds' sense of taste and discovery permits them to select out those particular particles which are more palatable to them than others and thus defeat the purpose of feeding a composite or compound food either in the form of dry or wet mash. With our own invention we so intermix, blend, and compress together the materials desired in a compound feed that they adhere together in form and may be made in kernels or granules of a desired size to correspond to the sizes of grains that may be made to suit any age or development of the chickens from hatching time to final development for the purposes desired by the feeder and our object is to produce these compound feeds of granular form meals so finely mixed and compressed together that the feed, as it were, has in each single granule or kernel the balanced ration desired. As an illustration; we blend together corn, milo, oats, wheat flour, middlings, bran, gluten meal, corn germ meal, salt, calcium carbonate, charcoal, bone meal, meat scrap, cod liver oil, and molasses or other similar material desired in the feed to be used in compressed granules or kernels substantially homogeneous in their content having all of the elements so intermixed and compressed together as to appear substantially as a grain element which will not break down, disintegrate, or from which the bird or animal may not pick out and eat one thing that is tasty to him and leave the rest, but will be compelled to take the complete kernels, as it were, when it feeds on them.

The materials which form the feed as above indicated vary widely in their contents of moisture and amounts of what might be termed gelatinous material, such as starches, dextrines, fat and oil material to the end that those materials as normally found on the market will not readily form into a granule that will stay in shape save only when treated by the methods and apparatus which we have invented.

Some materials that are desired to be used in a feed of this kind are so low in moisture and others so low in fat and most of them lacking in what might be termed binding or sticking qualities that a special treatment must be given these materials in the assembled form to result in bringing them into the desired granule shape as a compound article and to bring this about we use the methods and apparatus which will now be described.

Reference will be had to the accompanying drawings in which Fig. 1 is an elevational view of the special machine employed in performing part of the work of our method of converting materials used into shape for granular form.

Fig. 2 is a vertical section elevation of part of the machine shown in Fig. 1 being the part that intermixes and compresses together the materials used.

Fig. 3 is a cross section of the mixing and compressing chamber and compressing worm shaft on line 3—3 of Fig. 1.

Fig. 4 is a sectional elevation showing a method of feeding a part of the material which comes in liquid form.

Figure 6:
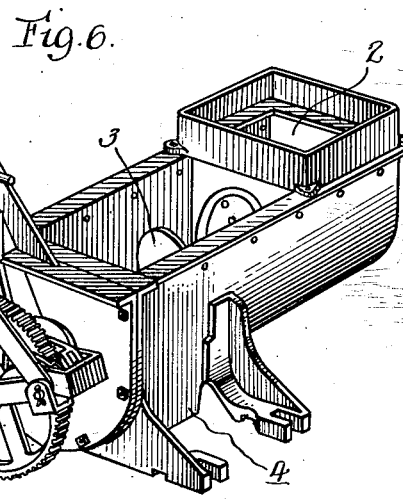
Fig. 6 is a perspective view of the feeding mechanism which feeds the material in meal form to the machine shown in Fig. 1 but any other suitable feeding apparatus may be used.

The desired materials which are to be compounded and delivered into granular form, materials of the class herein above mentioned, are first ground into meals of varying degree of fineness but as a general statement quite fine, passing through what might be termed a screen of number 8 mesh. These materials are weighed out for the different percentages desired in the final granule or kernel and are then mixed together by an ordinary mixing machine of any suitable character and this material then is delivered by any suitable conveyor to the delivery spout 2 (see Fig. 1), wherein it passes down to a screw conveyor illustrated in perspective view in Fig. 6 and the screw conveyor being indicated by 3. This mixes and conveys the material longitudinally to where it drops out at the point 4 of Fig. 6 and Fig. 1 down into a further mixing box 5 in which there is a screw or worm conveyor 6 shown in dotted lines in Fig. 1. The box 5 is provided with a steam jacket 7 which heats the box 5 and its contents of the material in the box which is being carried along by the worm or screw conveyor 6.

One of the materials which comes in liquid form is introduced by a spout or pipe 50 from any suitable source of supply (see Fig. 4) which has a continuous flow and the pipe 50 discharges material into an inclined spout 51 which extends over a portion of the box 5 and in the bottom of this inclined spout 51 there are perforations 52 which allow a certain amount of the liquid material which is delivered by the pipe 50 to drop through the holes 52 into the mass contained in the box 5, the surplus not passing through the holes 52 passing down and dropping into a reserve container 53 indicated by dotted lines in Fig. 4 from which it is again taken by any suitable means provided to the source of supply which feeds the pipe 50. The amount of drip of any material to be delivered through the holes 52 to the box 5 is controlled by the damming off of some of the holes 52 by any suitable means here shown by being that of nails 54. Thus a close regulation of the amount of liquid material that may be entered into the mix may be had since these nail holes are small and the speed is regulated by the mass passing through the machine; those materials or any other material that will flow as desired may be introduced in the mass by this means or by any other suitable means of supplying the required quantity of such liquid material.

Figure 7:
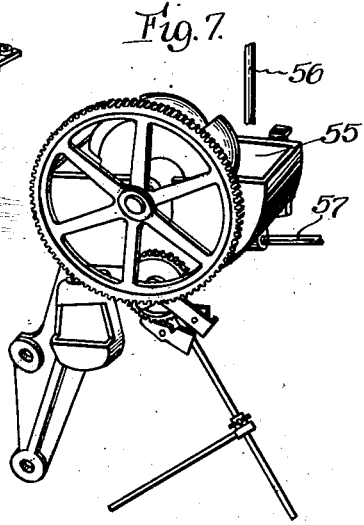
Fig. 7 is a perspective view of an additional feeding mechanism for feeding liquid such as water or oil, but any other suitable mechanism may be used for this purpose.

Another feeder for water or other liquids such as oil, is shown in perspective in Fig. 7 which has a box or container 55 supplied by a pipe 56 from any suitable source of supply and this liquid feeder discharges measured quantities through the pipe 57 to the material delivered by the worm 3. An overflow for excess of feed of the pipe 56 is provided by pipe 59 which goes back to source of supply of pipe 56.

Figure 1:
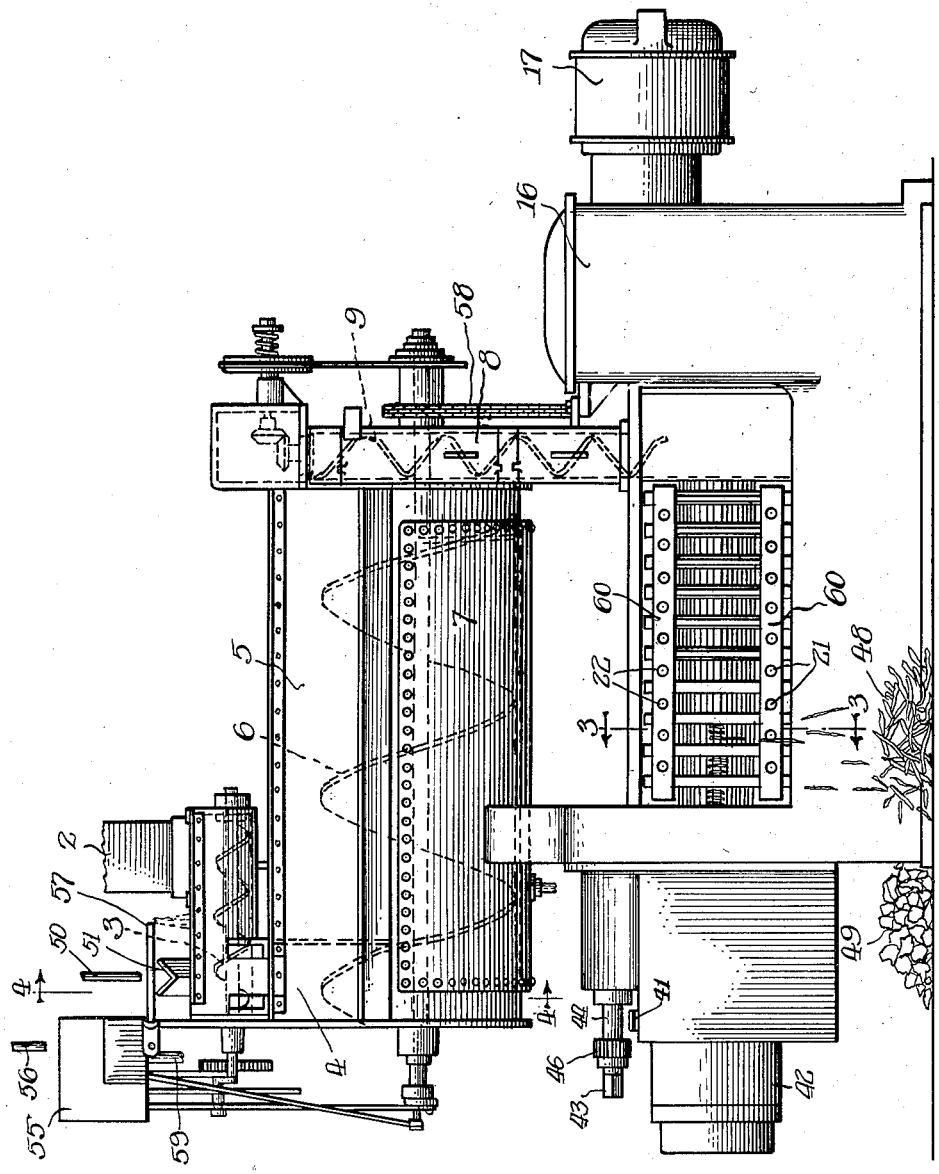
Figure 5:
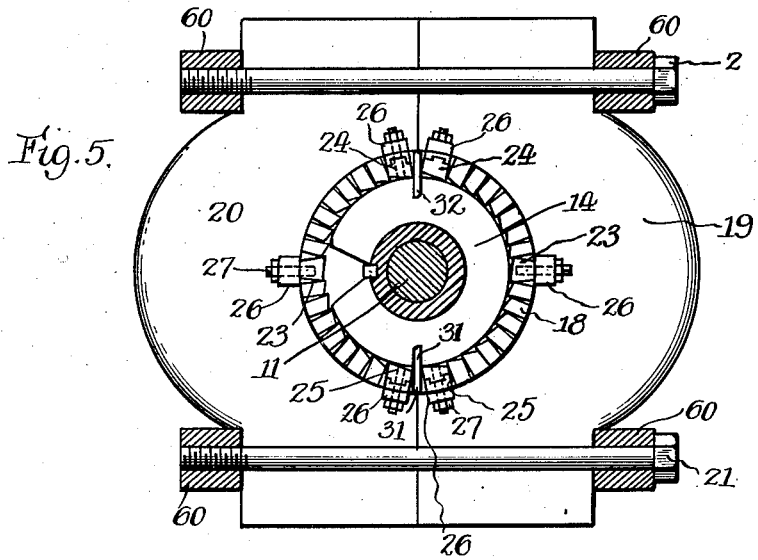
Fig. 5 is a transverse sectional elevation of the mixing and compressing chamber showing the clamps that hold the sections together on line 5—5 of Fig. 2.

In the box 5 the material is thoroughly mixed together and is heated and passed into a vertical discharge pipe at the right end of Fig. 1 indicated by 8 and in this vertical discharge pipe there is a vertically arranged revolving worm feed bar 9 shown in dotted lines in Fig. 1 which feeds the material down to a screw or worm press shown in section in Fig. 2 the material coming into the press through the opening indicated by 10 in Fig. 2. The opening 10 opens up into a longitudinal cylindrical chamber in which there is mounted and revolved a shaft 11 upon which there are worm or screw segments 12, 13, 14 and 15. The shaft 11 is revolved through the medium of gearing in a box 16 which gearing is connected to be driven by any suitable source of power here indicated by a motor 17 (see Fig. 1). The longitudinal chamber into which the shaft 11 with its worm or screw blocks fixed thereon is mounted and revolved is composed of a series of longitudinal steel bars 18 clamped together by a series of powerful clamps 19 and 20 (see Fig. 5) bound together by bolts 21 and 22 passing through bars 60.

The bars 18 are held in clamps 19 and 20 by means of wedging bars 23, 24, 25, of each set, one being on each side of the vertical center line, the bars 23, 24 and 25 being secured into longitudinal bars 26 through the medium of bolts 27.

The bars 26 are short bars between the several sets of clamps 19 and 20. On the shaft 11 at the points 28, 29, and 30 the screw or worm blocks 12, 13, 14 and 15 are absent leaving plain surfaces on the outer surface of the shaft and interposed between the bars 18 at the tops and bottoms of the cylindrical chamber there are scraper bars 31 and 32 which have surfaces which scrape the blank spaces 28, 29, and 30 and thus, as it were, prevent the material desired to be fed forward from simply revolving around the shaft and not being pressed forward toward the discharge orifice, but with these scraper bars the material is so dislodged at the points 28, 29 and 30 that it continues to move forward under the influence of the worm or screw blocks.

The shaft 11 revolves in a direction that forces the material which is delivered to the cylindrical chamber at the opening 10 (see Fig. 2) to the left of the said figure and by progressive movement of the material through the cylindrical chamber being forced there by the said screw blocks the material is mixed and put under pressure, the pressure getting more and more as the material travels leftward along the cylindrical chamber. At the left of this cylindrical chamber it terminates in an end plate 33 which has an annular orifice 38. On shaft 11 there is an annular sleeve 35 having a radial thickness equal to the hub of worm block 15. The space 34 at the sleeve 35 is equal to the height of the worm or screw thread of the block 15.

On the left end of this shaft 11 sliding over the sleeve 35 there is a cone block 36 having a rounded nose 37 and this cone block is adjustable along the length of the shaft 11 to enter into and change the shape and size of the orifice 38 in the plate 33 or dam off this orifice entirely.

The cone block 36 (see Fig. 2) is connected to and travels with a gear 39 which is threaded on threads 40 on the shaft 11, the shaft 11 extending to the left of the machine as shown in Fig. 2 and has mounted thereon in fixed position to revolve with the shaft a gear 41. In housing 42 there is a heavy thrust bearing which holds the shaft from being pushed toward the right under the thrust action of the worm blocks 12, 13, 14 and 15. Thus as the material is pushed forward through the cylindrical chamber by the said worm or screw blocks 12, 13, 14 and 15 the material is compressed harder and harder by the reason of the friction of traveling along the cylindrical chamber and this friction may be adjusted to be more or less by means of adjusting the cone sleeve block 36 to or from the plate 33 opening or closing, as it were, the orifice 38 where through the material is discharged by movement of the worm blocks. It is desirable to adjust the size of this orifice 38 while the machine is in operation by moving the cone block 36 to the right or to the left along the shaft 11 and this adjustment is brought about by hand when desired by placing a wrench on the end 43 of a shaft 44 which is suitably mounted in the frame of the machine and carries a long pinion 45 which engages with the gear 39 and thus moves the gear on its screw thread 40 on the shaft 11 and thus may move the sleeve 36 in relation to the orifice 38 in the plate 33. When no movement is required of the sleeve 36 the friction of the sleeve 36 and gear 39 on the shaft 11 constantly drives the pinion 45 when the same may run idle which is at all times possible when the position of the parts are as shown in Fig. 2 but upon the shaft 44 there is splined a pinion 46 which may be shoved on its spline in position to engage with the gear 41. Then as the gear ratio of the gear 41 to the pinion 46 and the gear 39 and long pinion 45 is different, a slight movement of the gear 39 is brought about at each revolution of the shaft 11 and thus the cone 36 may be pushed by power to move longitudinally on the shaft 11 and when the right adjustment has been made the pinion 46 is slid to the left and disengaged from the gear 41. Thus any adjustment may be made of the sleeve 36 or it is allowed to remain as a set adjustment. The material is pushed by the said worms out through the orifice 38 and falls down in compressed slabs or pieces of peculiar shape amounting to what might be termed pieces of a ruptured annular cylinder. This rupturing is brought about by the discharge of the material coming out over the nose of the cone 36. As the material passes to the left along the cylindrical chamber it is constantly crushed, ground, mixed, and pressed together under such tremendous pressure as it reaches the left end of this cylindrical chamber to the orifice 38 that the contents of moisture, oil, gum, gelatinous starch, dextrines, fat, and other material is pressed from those materials which have a surplus of these materials termed binder materials from one class of material into the other class and thus distributes these binder materials into the whole mass, the previous heating having softened, as it were, any waxy, greasy, or adhesive material that may yield to heat into a sufficiently plastic condition to cause the same to distribute itself from any particles of material that have a surplus over into those that have a deficiency and this together with the frictional heat which is developed by grinding, crushing, twisting and mixing actions of worm blocks presses this material so tightly together that when the pressure is released the greater part of the material stays in cakes or pieces which adhere together. Thus there is converted the material which was meal on entering the machine into broken cakes, and strings of material in a state substantially as dense as that of cereal grains before the grains are ground, and of different hardness, harder than some grains and softer than others, but hard enough sufficiently to hold, as it were, in form the cakes which come from this screw press and which are later converted in kernels or granules by cutting and crushing mechanisms not herein shown.

The materials used in this apparatus to form granules are relatively low, as it were, in total moisture content, probably not exceeding 12 percent, or possibly in exceptional cases 15 percent, as an average statement of the total moisture content although perhaps in some instances this may run to about 15 percent with some of the material used as separate elements.

The point is that the fat, oil, gum, and moisture contents of the whole mass taken as a whole may not be great enough to permit it to flow back and forth or past the worm or screw blocks without being forced forward into the compressed state at the discharge end of the machine.

At or near the orifice 38 the pressure becomes so great in the cylindrical chamber that this pressure is relieved by a series of perforations 47 in the zone of the screw blocks 15 (see Fig. 3) and owing to the great pressure of the material in this section of the cylindrical chamber there is provided a series of small holes 47 through which some of the material is discharged and comes out in the form of ropey strings having somewhat the appearance of large earthworms, the heat and pressure being so great that this material passing through the holes 47 hangs together and falls down the side of the machine as indicated by 48 in Fig. 1, while that material which passes out the orifice 38 falls down in cakes or blocks indicated by 49 in Fig. 1. Thus the material is discharged from the machine in two forms, one of them being in stringy, ropey, wormlike shape as indicated by 48 and broken cakes as indicated by 49. The heat developed in this cylindrical chamber and along the shaft 11 together with the preheating given the material in the box 5 so softens the waxy adhesive material of any ingredient sufficiently to flow from the material into which it comes in contact over into the other materials and acts to form a binder that holds the materials together in cakes and strings 49 and 48. The cooling which immediately takes place on its discharge from the cylindrical chamber acts to set this gummy, waxy, oily, or gelatinous material and thus leave the material in a hardened state sufficient after a period of cooling and curing to permit this material to be cut up into the sizes of the granules or kernels desired for the feed. This breaking or cutting up of the material as delivered in the forms of strings or wormlike appearance at 48 and in cake form at 49 is then allowed to cool and cure for a period of time sufficient to allow the hardening or setting of the binder material therein contained and then after this cooling procedure is completed these strings and cakes are put into any other suitable mechanism which will cut them up into small kernels or granules of the size desired, this machine being an ordinary machine used in cutting grains such as corn for chicken feed sizes.

During the cutting of this material into the desired size of the granules or kernel there is a small percentage of it that appears as meal or dusty particles and then the mass is passed over a screen which separates the kernels or granules into one or more size kernels, etc. and the dusty or meal portions are held in reserve until a sufficient quantity is accumulated and then this is put through the apparatus above described being the screw press as shown and it again in turn is pressed into the wormlike and cakelike shapes previously described since the constituents of the material are substantially then as that when first introduced the difference being that this new meal is homogeneous in itself and the waxy or binding material diffused in the mass, so that all that is needed to again make this material into cake and stringy form from which the granules are made is sometimes to supply a small amount of moisture and to reheat and repress it when it will then go together into the desired cakes, etc. from which the granules or kernels are cut and thus substantially all of the dust or meal portions which are sifted out from the granules may be conserved and converted into the same sort of kernel or granule material.

The small apertures 47 serve to increase the capacity of the machine over what might take place were all the material to be discharged through the orifice 38 and the damming off of these apertures 47 does not materially increase the amount of discharge that may pass through the orifice 38 since the increased frictional resistance and the lack of the agitation and internal movement of the particles that would be wanting with the holes 47 closed diminishes the flow of the material out of the orifice 38 so that by the adding of the holes 47 no diminution takes place in the compressed state of the cakes or chips that are discharged through the orifice and appear at 49. These holes 47 let a pressure be developed and yet increase the capacity without diminishing the quality of density desired in the product as finally discharged from the press.

The quantity of flat, oil, moisture, or other material which might be pressed out of any one of the food elements used in the mixture of the meal is not so great but the corresponding deficiency in other parts of the meal permits all of those substances which are pressed out of the one to be absorbed in the entire mass and thus there comes out from the press no liquid or by-product forced out by the high pressure invoved, the point being to so compound the meals and arrange the discharged holes 47 and the orifice 38 that the only result obtained by the high pressure developed in the cylindrical chamber is in forming a dense mass without losing any of the material which is put in save only as to the heat developed both by heating in the box 5 and the frictional heat developed by the worm or screw feeds does develop a temperature at and near the discharge orifice sufficiently high to drive off some of the moisture so that there does actually take place in the machine a lessening of the moisture content as the material passes through it, the lessening of the moisture content being one of the factors which assists in hardening the material into the mass which will hold together as kernels or granules as desired.

If the moisture content is too low—say normally below 5 percent for the whole mass—the product made is not as desirable nor will it form the kernels and granules sought for for the purpose desired. On the other hand, if the moisture content of the meal which is admitted in the first place exceeds say about 12 to 15 percent of the total content of the whole mass the desired results are likewise not obtained.

One feature of our invention resides in so compounding the materials used in the meals that they will contain sufficient moisture and binding material that will become active as binders under the heat and high pressure and agitation and mixing together under this heat and high pressure as to form the material into a cake nature which will stay together when crushed or cut into the granules of the size desired for the feed, as described.

The shaft of the screw conveyor is driven from the gearing in the gear box 16 by any suitable means indicated by a chain 58 running over sprockets which is not deemed necessary to show in the drawings and the mechanism which drives the feed conveyor 3 and the water feeder is connected to be actuated by any suitable mechanism from shaft of conveyor 6 and it is deemed not necessary to show these details.

What we claim is:—

1. An apparatus for converting different feed meals into compressed state, comprising a compressing chamber having an inlet opening at one end, a discharge opening at the other end, and a plurality of relatively small apertures located in the upper half only of the chamber adjacent the discharge opening, and means for compressing and extruding material passed into said chamber through the discharge opening and the said apertures.

2. An apparatus for converting different feed meals into compressed state, comprising a compressing chamber having an inlet opening at one end and a variable discharge opening at the other end and a plurality of additional discharge apertures formed in the upper half only of the chamber wall adjacent the discharge outlet, means for feeding a heated plastic mass of granulated feed materials through the inlet opening, and means within the chamber for extruding said mass through the discharge outlet and the additional discharge apertures.

3. An apparatus for converting different feed meals into compressed state, comprising a compressing chamber having a discharge opening at one end and additional discharge apertures located only in the upper half of the discharge end portion of the chamber, means for varying the size of the discharge opening, and a screw compressing member rotatable in said chamber.

Signed at Chicago in the county of Cook and State of Illinois, this 29th day of May, 1928.

HUGH HARDING GOFF.
GEORGE MAXSON CHAPIN.